US009183686B2

(12) United States Patent
Noone et al.

(10) Patent No.: US 9,183,686 B2
(45) Date of Patent: Nov. 10, 2015

(54) METHOD AND SYSTEM FOR PEOPLE COUNTING USING PASSIVE INFRARED DETECTORS

(75) Inventors: David R. Noone, Delray Beach, FL (US); Adam S. Bergman, Boca Raton, FL (US); Robert Kevin Lynch, Greenacres, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 443 days.

(21) Appl. No.: 13/181,308

(22) Filed: Jul. 12, 2011

(65) Prior Publication Data

US 2013/0015355 A1 Jan. 17, 2013

(51) Int. Cl.

*G01J 5/02* (2006.01)
*G07C 11/00* (2006.01)
*G07C 9/00* (2006.01)
*G08B 13/24* (2006.01)
*G08B 13/191* (2006.01)

(52) U.S. Cl.

CPC *G07C 11/00* (2013.01); *G07C 9/00* (2013.01); *G08B 13/248* (2013.01); *G08B 13/191* (2013.01)

(58) Field of Classification Search

CPC ............. G01J 5/10; G07C 9/00; G07C 11/00; G08B 13/248; G08B 13/191
USPC ........................... 250/340, 349; 340/551–557
See application file for complete search history.

(56) References Cited

U.S. PATENT DOCUMENTS

| | | | | |
|---|---|---|---|---|
| 2004/0239503 | A1* | 12/2004 | Rider et al. | 340/572.1 |
| 2005/0184869 | A1* | 8/2005 | Micko | 340/567 |
| 2010/0039264 | A1* | 2/2010 | Bergman | 340/572.1 |
| 2011/0109455 | A1* | 5/2011 | Bergman et al. | 340/568.5 |

* cited by examiner

*Primary Examiner* — David Porta
*Assistant Examiner* — Gisselle Gutierrez
(74) *Attorney, Agent, or Firm* — Alan M. Weisberg; Christopher & Weisberg, P.A.

(57) ABSTRACT

A method and system for detecting an object transiting an interrogation zone of an electronic article surveillance ("EAS") system and determining whether the object is a person entering or exiting the facility in order to increment a corresponding counter. A first zone detector detects motion in a first zone. The first zone detector can be a first passive infrared ("PIR") detector. A second zone detector detects motion in a second zone different from the first zone. The second zone detector can be a second PIR detector. A processor is in communication with the first and second zone detectors in which the processor receives data from the first and second zone detectors to determine whether to increment a count value based at least in part on the received data.

20 Claims, 8 Drawing Sheets

METHOD AND SYSTEM FOR PEOPLE COUNTING USING PASSIVE INFRARED DETECTORS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to people counting and in particular to a method and system for detecting an object transiting an interrogation zone of an electronic article surveillance ("EAS") system and counting the objects when the objects are determined to be people.

BACKGROUND OF THE INVENTION

Electronic article surveillance ("EAS") systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone". Articles to be protected are tagged with an EAS marker that, when active, generates an electromagnetic response signal when passed through this interrogation zone. An antenna and receiver in the same or another "pedestal" detects this response signal and generates an alarm.

One characteristic of the EAS interrogation zone is that consumers usually must walk through the interrogation zone to enter/exit the facility. This characteristic provides an area where the facility can track all people that visit the facility. Tracking people transiting the interrogation zone provides valuable consumer information that enables a business to calculate the percentage of store visitors that make purchases, determine consumer traffic at certain periods of the day, determine optimum staff shifts and determine whether a store promotion increased consumer traffic, among other statistics.

Different technologies have been incorporated by retailers to track the number of entering and exiting consumers. These technologies range from video imaging to thermal imaging of consumers. For example, video imaging relies on a video stream or series of images that are produced by a security camera at the entrance/exit of the store. The video stream may be processed to enable consumer tracking. However, video imaging involves separate processing computer(s) to implement complex algorithms for digitally filtering the consumer from the background in order to track the consumer. Due to the need for digital filtering, these systems may not work in low light levels, i.e., cannot distinguish a person from the background. Also, the cost associated with video imaging systems is often substantial and may require repeat calibration. Video imaging systems are also more intrusive to consumers as these systems function by processing identifiable images of people.

Thermal imaging is another technology that may be used to track consumers. For example, thermal imaging systems may use a sensor array to detect heat sources within a given area. Thermal imaging systems are less intrusive on consumer because they do not processing identifiable images of people to track consumers. However, thermal imaging systems detect all heat sources passing an entrance such as a person, pet or even a shopping cart that has been in the sun. Therefore, the accuracy of thermal imaging systems may be lower due to their inability to distinguish between heat sources.

Therefore, what is needed is a non-intrusive system and method for detecting and counting people transiting an interrogation zone of an electronic article surveillance ("EAS") system.

SUMMARY OF THE INVENTION

The present invention advantageously provides a method and system for detecting an object transiting an interrogation zone of an electronic article surveillance ("EAS") system and determining whether to increment a people counter based on whether the object is a person and whether the person is entering or exiting the facility. Generally, the present invention determines the direction of movement of the object and determines whether the object is a wheeled-object or a person walking between a pair of EAS system pedestals based on a breakage pattern from a sensor array located on the pedestals just above the floor.

In accordance with one aspect of the present invention, a system for counting includes a first zone detector detecting motion in a first zone. The first zone detector is a first passive infrared ("PIR") detector. A second zone detector detects motion in a second zone different from the first zone. The second zone detector is a second PIR detector. A processor is in communication with the first and second zone detectors, in which the processor receives data from the first and second zone detectors to determine whether to increment a count value based at least in part on the received data.

In accordance with another aspect of the present invention, an Electronic Article Surveillance ("EAS") system includes a people counting device having a first object detector detecting objects located within a first zone. The first object detector transmits a signal generated in response to detecting an object. A timer starts a timing sequence upon receiving the detection signal transmitted by the first object detector. A sensor array detects the object and provides a sensor detection signal. A cart detection module differentiates between a wheeled-object and a person passing through the sensor array based on the sensor detection signal. A controller is in communication with the first object detector, cart detection module, and timer. The controller operates to receive data from the first object detector and the timer to initiate gathering information from the cart detection module to determine whether to increment a people counter value.

In accordance with yet another aspect of the present invention, a method is provided for counting objects using an Electronic Article Surveillance ("EAS") system. An object moving within a first zone is detected. The object moving within a second zone different from the first zone is detected. A timer sequence is initiated in response to the detection of the object in at least one of the first and second zones. A determination is made as to whether the object is a wheeled device or a person. A first people count value is incremented when the object is detected in the first and second zone prior to expiration of the timer sequence and the object is determined to be a person.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
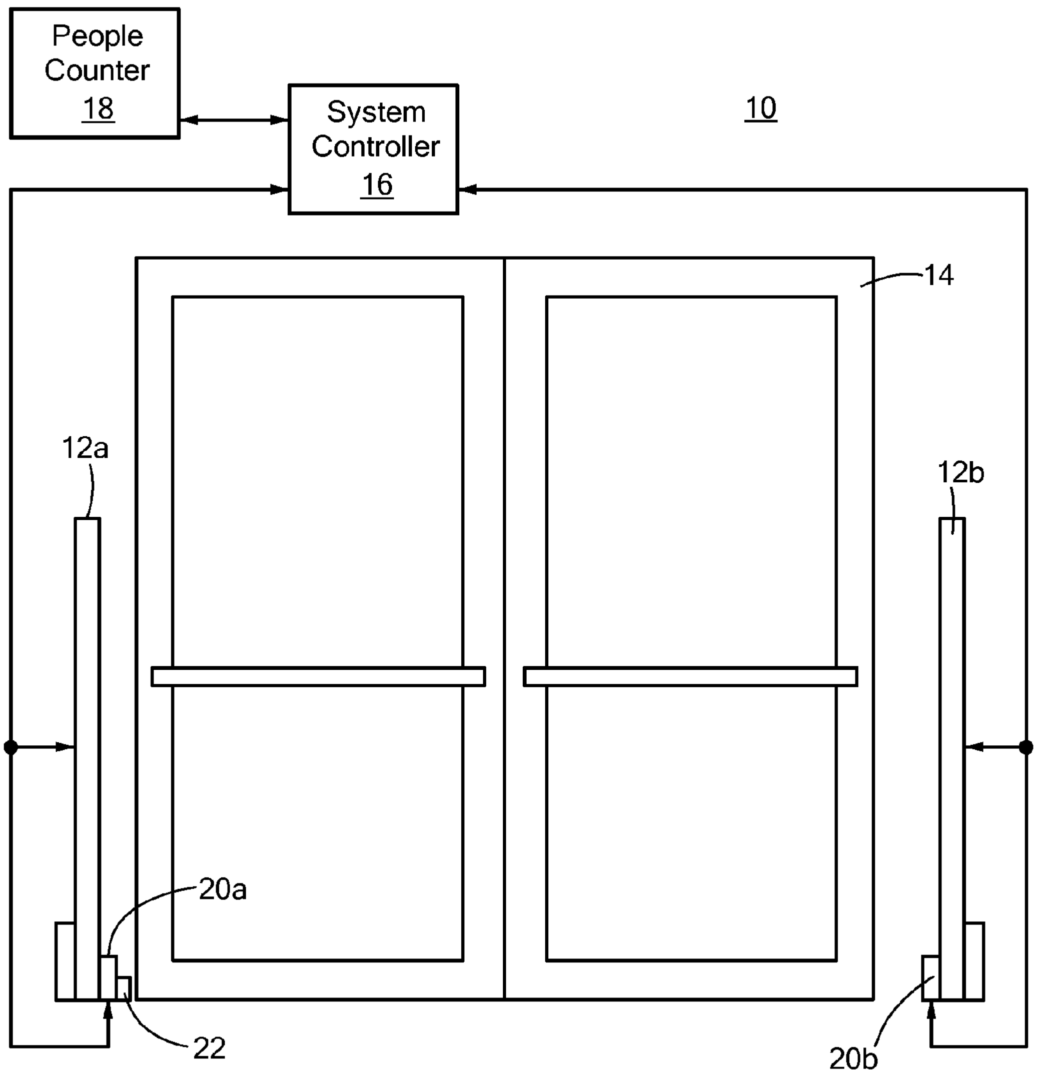
FIG. 1 is a block diagram of an exemplary electronic article surveillance ("EAS") system having a people counter and cart detection capabilities constructed in accordance with the principles of the present invention.

Before describing in detail exemplary embodiments that are in accordance with the present invention, it is noted that the embodiments reside primarily in combinations of apparatus components and processing steps related to implementing a system and method for counting people transiting an interrogation zone of an Electronic Article Surveillance ("EAS").

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for counting people in an interrogation zone of an EAS system. The EAS system combines traditional EAS detection capability with passive infrared detectors ("PIR") and infrared sensor arrays located near the floor on the base of the EAS pedestals to detect the movement of an object passing through the interrogation zone and to determine whether the object is a person or wheeled-object. The object is detected moving within a first zone. The object is also detected moving within a second zone different from the first zone. The initial detection of the object in either zone initiates a countdown timer sequence. The system determines whether the object is a person or wheeled-object based on a pattern of broken infrared beams caused by the object. A people count value is incremented when the object is determined to not be a wheeled-object and/or determined to be a person and the pattern of broken infrared beams occurs during the countdown timer sequence.

Figure 5:
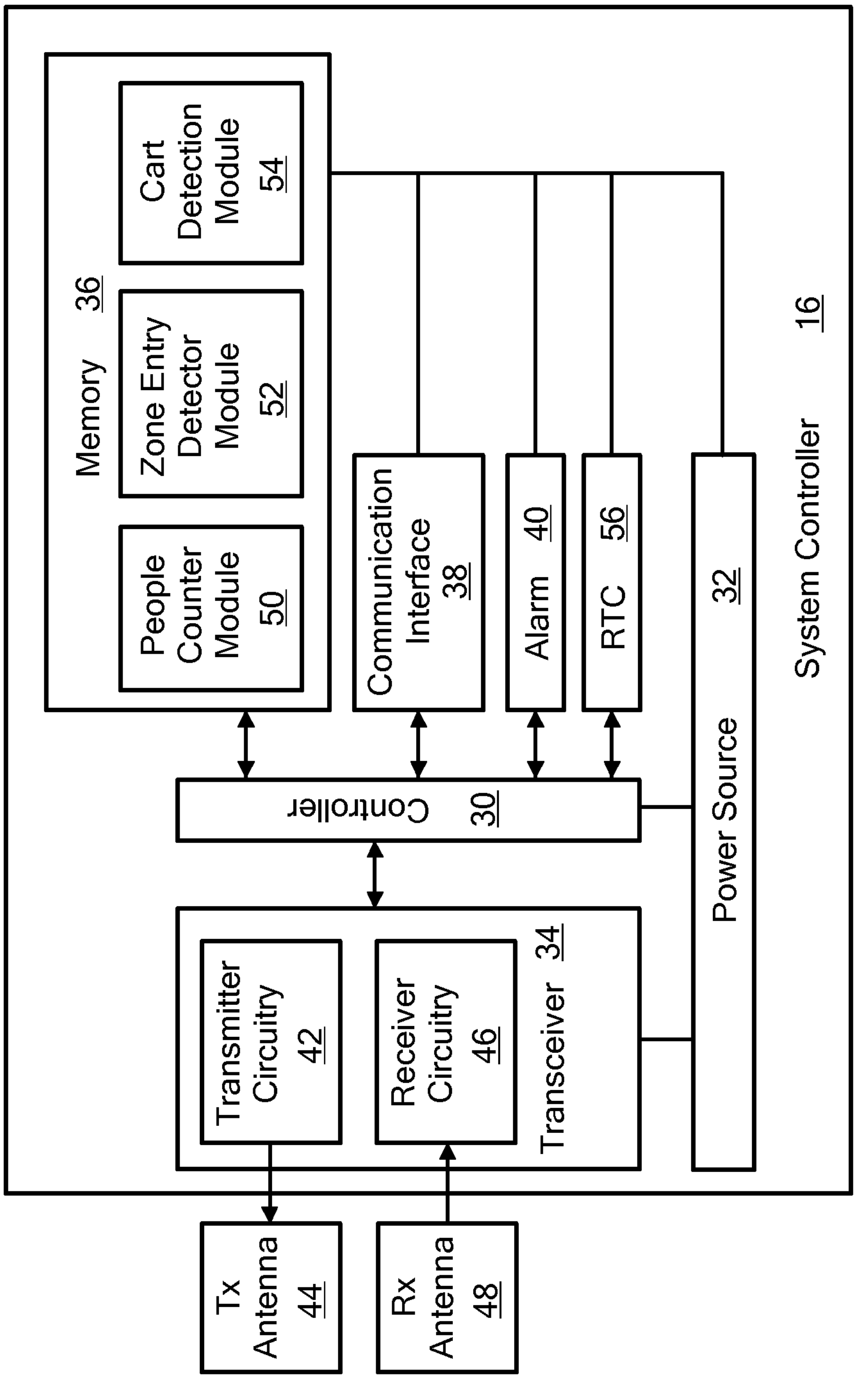
FIG. 5 is a block diagram of an exemplary EAS system controller constructed in accordance with the principles of the present invention.

Referring now to the drawing figures in which like reference designators refer to like elements, there is shown in FIG. 1 a configuration of an exemplary EAS detection system 10 constructed in accordance with the principles of the present invention and located, for example, at a facility entrance. EAS detection system 10 includes a pair of pedestals 12*a*, 12*b* (collectively referenced as "pedestals 12") on opposite sides of the facility entrance 14. One or more antennas for the EAS detection system 10 may be included in pedestals 12*a* and 12*b*, which are located a known distance apart. The antennas located in pedestals 12 are electrically coupled to a system controller 16 which controls the operation of the EAS detection system 10. The pedestals 12, via the antennas, are used to create an interrogation field to excite and detect active security tags located on objects passing between pedestals 12*a* and 12*b*. The system controller 16 includes a people counter 18 (illustrated outside controller 16) and is electrically connected to an infrared sensor array 20 and zone entry detector 22 for more accurately detecting the presence of a person. While people counter 18 is illustrated outside controller 16 in FIG. 1, the invention is not limited to such. People counter 18 may alternatively be located as part of controller 16 as illustrated in FIG. 5, positioned within pedestals 12, etc. Infrared sensor array 20 has of a pair of infrared sensor panels 20*a* and 20*b* (referenced collectively as "infrared sensor array 20") positioned at opposite sides of an interrogation zone. It is also contemplated that other types of sensor arrays can be used, such as a pressure sensitive mat arranged to provide data indicating where pressure has been applied, and the like.

The zone entry detector 22 may include passive infrared ("PIR") detectors, among other zone entry detectors. The zone entry detector 22 may be mounted on the infrared sensor array 20, directly on pedestals 12, among other locations. According to one embodiment, the zone entry detector 22 includes PIR detectors 22*a* and 22*b* positioned on infrared sensor array 20 at the same or different heights. For example, PIR detectors 22*a* and 22*b* may be positioned at ankle level or approximately 2 inches from floor level. Each PIR detector may include a lens and/or light baffle to establish its respective detection area. For example, a PIR detector using a Fresnel lens may only accept emitted infrared ("IR") signals incident within the acceptance angle of the lens. In other words, the PIR detectors may sense infrared emission changes occurring within the acceptance angle of the lens, i.e., creates an IR sensing "curtain" 28 across an area as discussed below. Furthermore, PIR detectors with different lenses or without lenses may be used in accordance with the invention. The PIR detectors 22*a* and 22*b* may be mounted on a detector side of the infrared sensor panels and may be positioned on infrared sensor array 20 at opposite sides of infrared sensor array 20 in a lateral direction and at a height and direction. Alternatively, PIR detectors may be mounted on the transmitter side of the infrared sensor panels or on different pedestals 12.

The PIR detectors 22*a* and 22*b* detect infrared emissions of an object passing through their respective detection zone, i.e., detect movement of the object. For example, PIR detectors 22*a* and 22*b* may detect movement of the object based on a change in detected infrared emissions caused by the object moving through their respective detection zone. The amount of detected infrared emission change needed to determine movement of the object may be varied based on design need. In other words, PIR detectors 22*a* and 22*b* may detect infrared emission of an object within the interrogation zone followed by the exit of the object out of the interrogation zone. According to one embodiment, detection signals from PIR detectors 22*a* and 22*b* detectors may be processed to determine the direction of movement of the object, i.e., whether the detected object is entering/exiting the facility. Specifically, PIR detector 22*a*, PIR detector 22*b* and infrared sensor array 20 produce temporally displaced detection signals that indicate the direction of movement of an object in the interrogation zone, i.e., the object is detected by one detector before the other. For example, the object triggers PIR detector 22*a* before PIR detector 22*b* so as to indicate that the object is entering the facility. For example, the object is determined to be entering the building when PIR detector 22*a* is triggered before infrared beams 26 are broken. Alternatively, the entering object may trigger infrared beams 26 before triggering PIR detector 22*b*. In other words, the entering object may trigger PIR 1 before triggering PIR 2 or vice-versa thereby indicating the direction of movement, but the pattern of broken infrared beams 26 will determine whether the object is person 24 or not. Accordingly, the people counter criteria may rely on infrared beams 26 detection signal and at least one PIR detection signal to determine whether to increment the counter (e.g., IN counter) and may also use all three detection signals.

Reversing the temporal order in which the detection signals of the entering object were triggered may be used as the people counter criteria for determining whether to increment the counter, e.g., OUT counter. For example, the object is determined to be exiting the building when PIR detector 22*b* is triggered before any of infrared beams 26 are broken. Alternatively, the two PIR detectors may be operated individually to detect entry or exit of an object through the interrogation zone.

Furthermore, infrared sensor array 20 detection signals in combination with at least one of the PIR detectors signals allows the system to accurately count people even with PIR detector “bleed” through. Generally, “bleed” through refers to a PIR detection zone covering an area outside of the desired interrogation zone. Bleed through may be caused by PIR detector misalignment or simply due to pedestals 12 not being completely solid so as to allow IR emissions to penetrate from behind the pedestal, among other reasons. For example, person 24 walking behind pedestals 12 and not within the interrogation zone, may trigger one or both PIR detectors because PIR detection zones 28*a* and 28*b* bleed through past pedestals 12. However, using the broken IR beam 26 pattern or lack thereof will indicate whether person 24 or object is actually within the interrogation zone. For example, person 24 may be in an adjacent interrogation zone as used in a three pedestal EAS system.

In particular, people counter 18, discussed in detail with reference to people counter module 50 in FIG. 5 may determine whether a person is entering or exiting the building based on detection signals from the PIR detectors and/or infrared sensor array 20. People counting data may then be transmitted to other portions of EAS detection system 10 using conventional networking components. The counter may include one or more counters to track the number of people entering and exiting the facility. The people counting data may be transmitted through the store’s internal network or across wide area networks such as the Internet, where it can be sorted, reported and studied.

Figure 2:
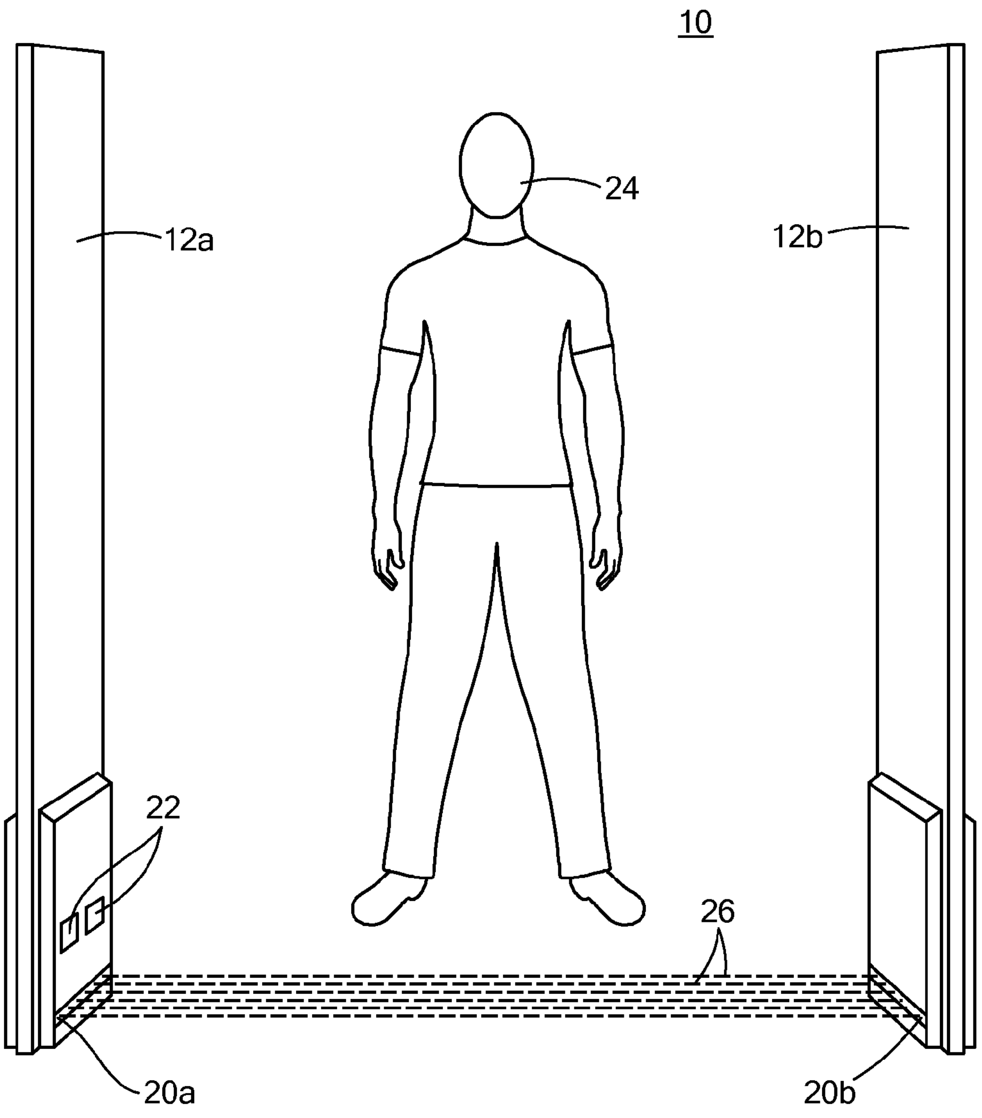
FIG. 2 is a front perspective view of a person transiting the exemplary EAS system of FIG. 1 constructed in accordance with the principles of the present invention.

Referring now to FIG. 2, there is shown a perspective view of person 24 transiting the EAS detection system 10. Infrared sensor array 20 is located at the base of pedestals 12 at a height, e.g., approximately ¼ inch (6.4 mm) to 2 inches (51 mm) from the floor. The length of the infrared sensor array 20 should be long enough to allow for differentiation of a breakage pattern for infrared beams 26 between a wheeled-object and a person’s foot, e.g., a length of at least 6 inches (152 mm). Infrared sensor array 20 is arranged such that the sensors produce multiple parallel infrared beams 26 between pedestals 12. Also, infrared sensor array 20 may include vertical layers or stacks of infrared sensor arrays such as to generate multiple horizontal layers of parallel infrared beams along pedestals 12. Because of the proximity of the beams to the floor, infrared beams 26 are broken by the wheels of a cart, stroller or other wheeled-objects passing between pedestals 12. The infrared beams 26 are also broken when person 24 walks between the pedestals 12. However, the pattern of breakage for person 24 walking through infrared beams 26 is different than the breakage pattern of the wheeled-object rolling through infrared beams 26. Sensor array 20 monitors its detection region to detect the objects breaking the beams of the array. Sensor array 20 generates a corresponding sensor detection signal.

For example, since the wheels of a cart never leave the floor, the cart will break infrared beams 26 sequentially and will pass through each infrared beam 26. In contrast, person 24 walking through infrared beams 26 may break several infrared beams 26 simultaneously and does not necessarily break each infrared beam 26 in infrared sensor array 20. By recognizing the differences in these breakage patterns, an embodiment of the present invention is able to distinguish between a person and a cart, stroller and other wheeled-objects, as discussed below in detail with reference to FIG. 8. System 10 may use the breakage pattern information to determine whether to increment the people counter. The operation of infrared sensor array 20, in combination with system controller 16, is discussed in greater detail below.

Figure 3:
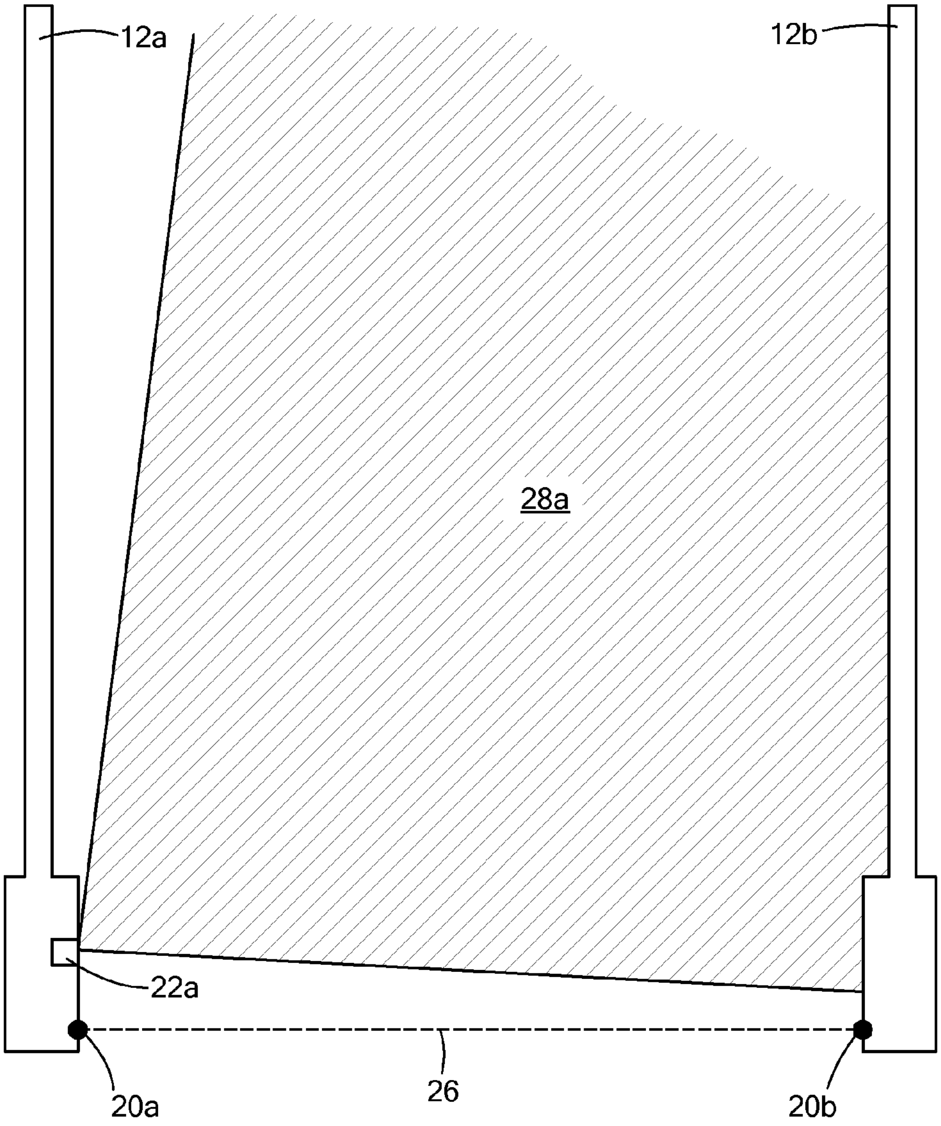
FIG. 3 is a front perspective view of the exemplary EAS system of FIG. 1 constructed in accordance with the principles of the present invention.

Referring to FIG. 3, there is shown a side view of EAS detection system 10. In particular, PIR detector 22*a* has PIR detection zone 28*a*. PIR detection zone 28*a* may be configured to detect IR emissions occurring above infrared beams 26 but within detection zone 28*a*. The area of PIR detection zone 28*a* may vary depending on the sensitivity of the PIR detector and/or the type of lens used, e.g., the PIR detection zone length and width may be varied based on PIR detector sensitivity. For example, increased PIR detector sensitivity may provide a longer and/or wider detection zone. Also, PIR detector 22*b* may have PIR detector zone 28*b* (not shown) substantial similar to or different from PIR detection zone 28*a*. Also, while PIR detector 22*a* is illustrated positioned proximate the bottom of the pedestal, PIR detectors 22*a* and/or 22*b* may be positioned proximate the middle or top of the pedestal. Varying the position of the PIR detectors 22*a* and 22*b*, using different lenses and/or using different light baffles may increase or decrease the likelihood of detecting particular people based on factor(s) correlated with a person’s height, e.g., age. For example, positioning PIR detectors 22*a* and 22*b* at the top of pedestals 12 combined with a lens and/or light baffle may decrease the likelihood of detecting children the ages of four to eight, e.g., children that are not tall enough to pass through PIR detection zones 28*a* and 28*b*. Also, some facilities encourage people to bring their animals, e.g., stores that sell pet supplies. By positioning the PIR detectors proximate the top of pedestals 12, the likelihood of erroneously counting an animal passing through the interrogation zone as person 24 is greatly reduced.

Figure 4:
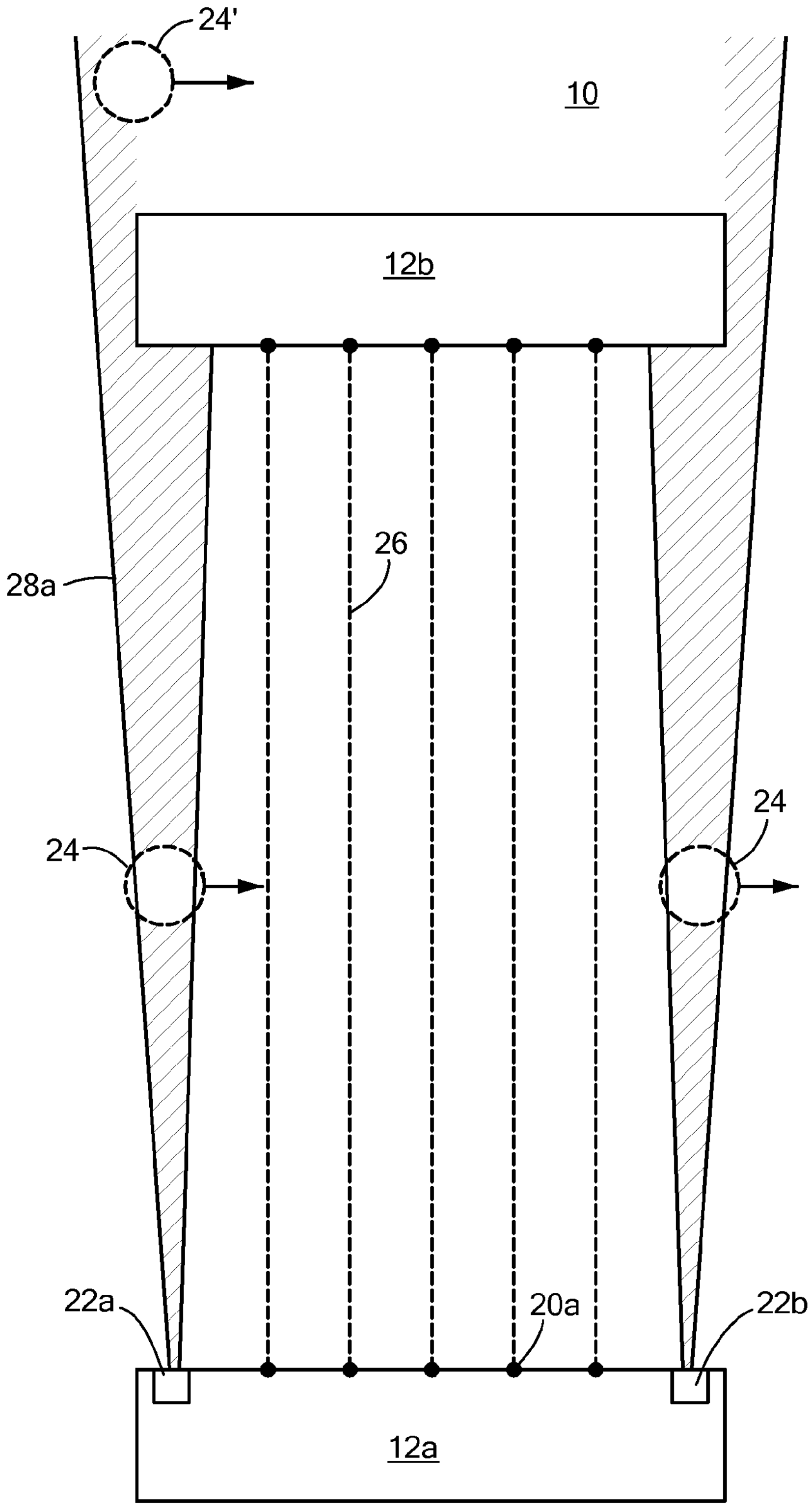
FIG. 4 is a top view of the exemplary EAS system of FIG. 1 constructed in accordance with the principles of the present invention.

FIG. 4 is a top view of the exemplary EAS detection system 10. In particular, there are illustrated PIR detector zones 28*a* and 28*b* for PIR detectors 22*a* and 22*b*, respectively. For example, PIR detector 22*a* has a first PIR detector zone 28*a* and PIR detector 22*b* has a second PIR detector zone 28*b*, in which the first zone is different from the second zone. PIR detection zone 28*a* may form a substantially cone shaped PIR detection zone 28*a* across the interrogation zone such that infrared signals within PIR detection zone 28*a* are detected by PIR detector 22*a*. Also, PIR detection zone 28*b* may form a substantially cone shaped PIR detection zone 28*b* across a different portion of the interrogation zone for detecting infrared signals within PIR detection zone 28*b*. For example, the infrared emissions of person 24 are detected by each PIR detector as person 24 moves within each PIR detector's detection zone. Alternatively, the PIR detection zones may overlap such that person 24 triggers both PIR detectors at substantially the same time. The overlapping PIR detection zones configuration may increase accuracy of detecting person 24 within the interrogation zone as opposed to detecting person 24' outside the interrogation zone, i.e., the detection zones may only overlap within the interrogation zone. The shape of PIR detection zone may vary depending on several factors such as lens type, light baffle type, PIR manufacturer, PIR alignment, PIR position, among other factors, e.g., shape of PIR detection zone may be other than substantially cone shaped. Also, the infrared sensor array may be positioned to emit infrared beams 26 substantially perpendicular to the pedestal 12.

Referring now to FIG. 5, an exemplary EAS system controller 16 may include a controller 30 (e.g., a processor or microprocessor), a power source 32, a transceiver 34, a memory 36 (which may include non-volatile memory, volatile memory, or a combination thereof), a communication interface 38 and an alarm 40. Controller 30 controls radio communications, storage of data to memory 36, communication of stored data to other devices, and activation of alarm 40. Power source 32, such as a battery or AC power, supplies electricity to EAS control system 16. Alarm 40 may include software and hardware for providing a visual and/or audible alert in response to detecting an EAS marker and/or object within an interrogation zone of EAS detection system 10.

Transceiver 34 may include a transmitter 42 electrically coupled to one or more transmitting antennas 44 and a receiver 46 electrically coupled to one or more receiving antennas 48. Alternately, a single antenna or pair of antennas may be used as both transmitting antenna 44 and receiving antenna 46. The transmitter 42 transmits a radio frequency signal using transmit antenna 44 to "energize" an EAS marker within the interrogation zone of the EAS detection system 10. The receiver 46 detects the response signal of the EAS marker using receive antenna 48. It is also contemplated that an exemplary system 10 could include a transmitting antenna 44 and receiver 46 in one pedestal, e.g., pedestal 12*a* and a reflective material in the other pedestal, e.g., pedestal 12*b*.

The memory 36 may store a people counter software module 50 for tracking people entering and exiting the interrogation zone, a zone entry detector software module 52 for determining the presence and direction of movement of an object proximate to an access point of the interrogation zone and a cart detection software module 54 for determining whether the detected object is person 24, cart, stroller or other wheeled-object, e.g., a wheel-chair, hand-truck, etc. In particular, a software module is a set of computer program instructions stored in memory that when executed by a computer processor causes the processor to perform certain steps, e.g., determining presence and direction of movement. In particular, the software modules may be executed by controller 30.

The people counting module 50 may include an IN counter and an OUT counter. Specifically, the IN counter corresponds to the number of people that enter the facility through the interrogation zone and the OUT counter corresponds to the number of people that exit the facility through the interrogation zone. The people counting module 50 may also have more counters and may reset the counters periodically or as indicated by the system administrator. The counters may be stored in memory 36.

The people counter module 50 may determine whether to increment the counter based on determinations made by the zone entry detector module 52 and cart detection module 54. For example, the zone entry detection module may determine an object has entered the interrogation zone based on zone entry detector 22 signals. Also, the cart detection module may determine the object is person 24 based on detection signals received from infrared sensor array 20. The people counter module 50 may use these determinations in order to determine whether to increment the counter, as discussed in greater detail below. This information may be communicated via communication interface 38. While people counter module 50 is shown stored in memory 36, people counter module 50 may alternatively be stored in memory of an EAS system add on device having processing and communicating capabilities similar to system controller 16. The controller 30 may also be electrically coupled to a real-time clock ("RTC") 56 which monitors the passage of time. The RTC 56 may act as a timer for controller 30 to determine whether actuation of events, such as person counting, occurs within a predetermined time frame, e.g., countdown or count up timer. The RTC 56 may also be used to generate a time stamp such that the time of an event detection may be logged, e.g. time stamp incrementing the counter.

Figure 6:
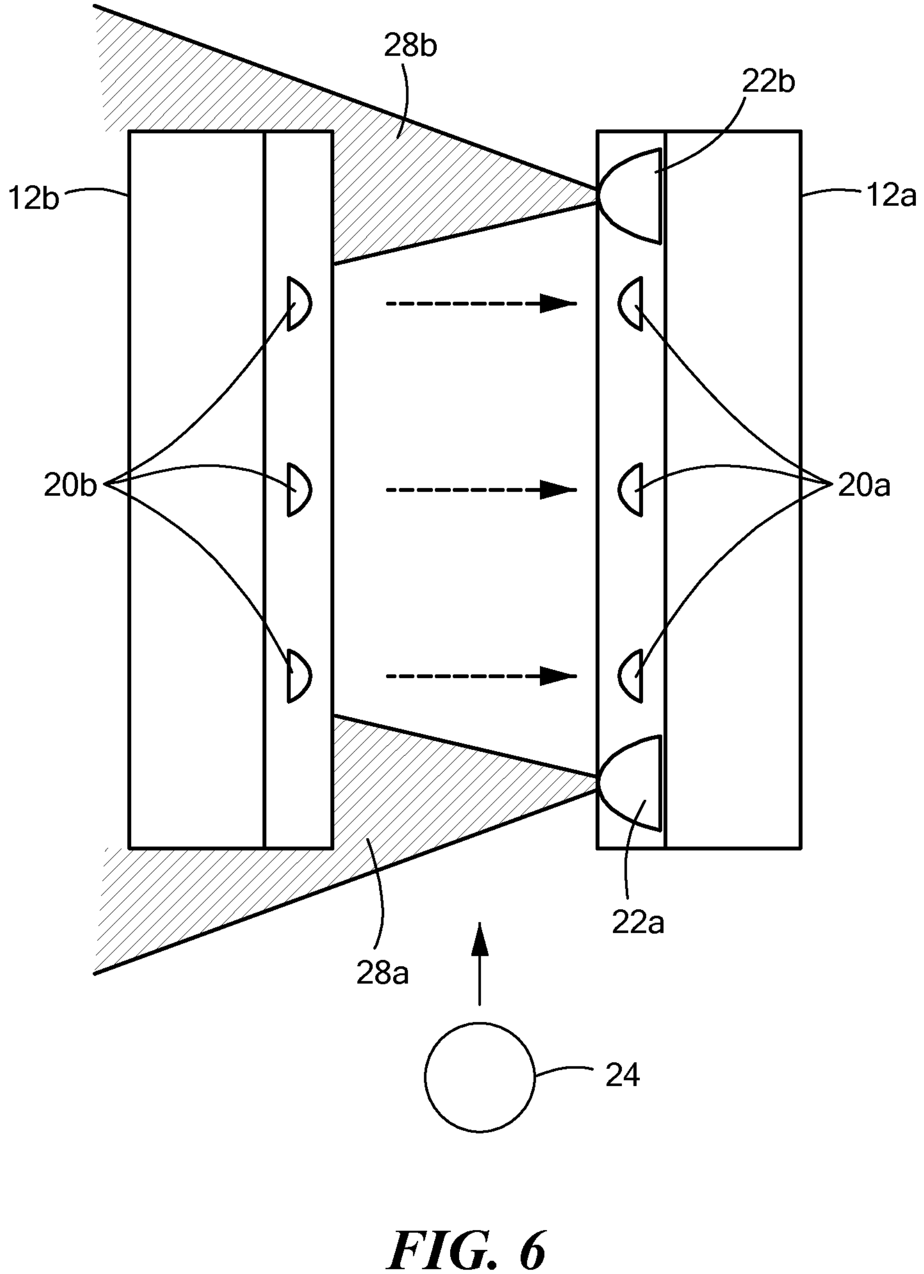
FIG. 6 is a top view of a person entering the exemplary EAS system of FIG. 1 constructed in accordance with the principles of the present invention.

Referring to FIG. 6, there is shown PIR detectors 22*a* and 22*b* provided at detector side, of pedestals 12. For example, PIR detector 22*a* and PIR detector 22*b* may be placed on opposite sides of IR beam array 20 in a lateral direction. The first PIR detector 22*a* may monitor a PIR detection zone 28*a* at a first access point, and a PIR detector 22*b* may monitor a PIR detection zone 28*b* at a second access point. It should be noted that, while FIG. 6 shows two PIR detectors, the number of PIR detectors shown is for illustrative purposes only. For example, the system may operate with a single PIR detector or more than two PIR detectors. Similarly, infrared sensor array 20 may have more or less infrared elements than illustrated in FIG. 6.

Figure 7:
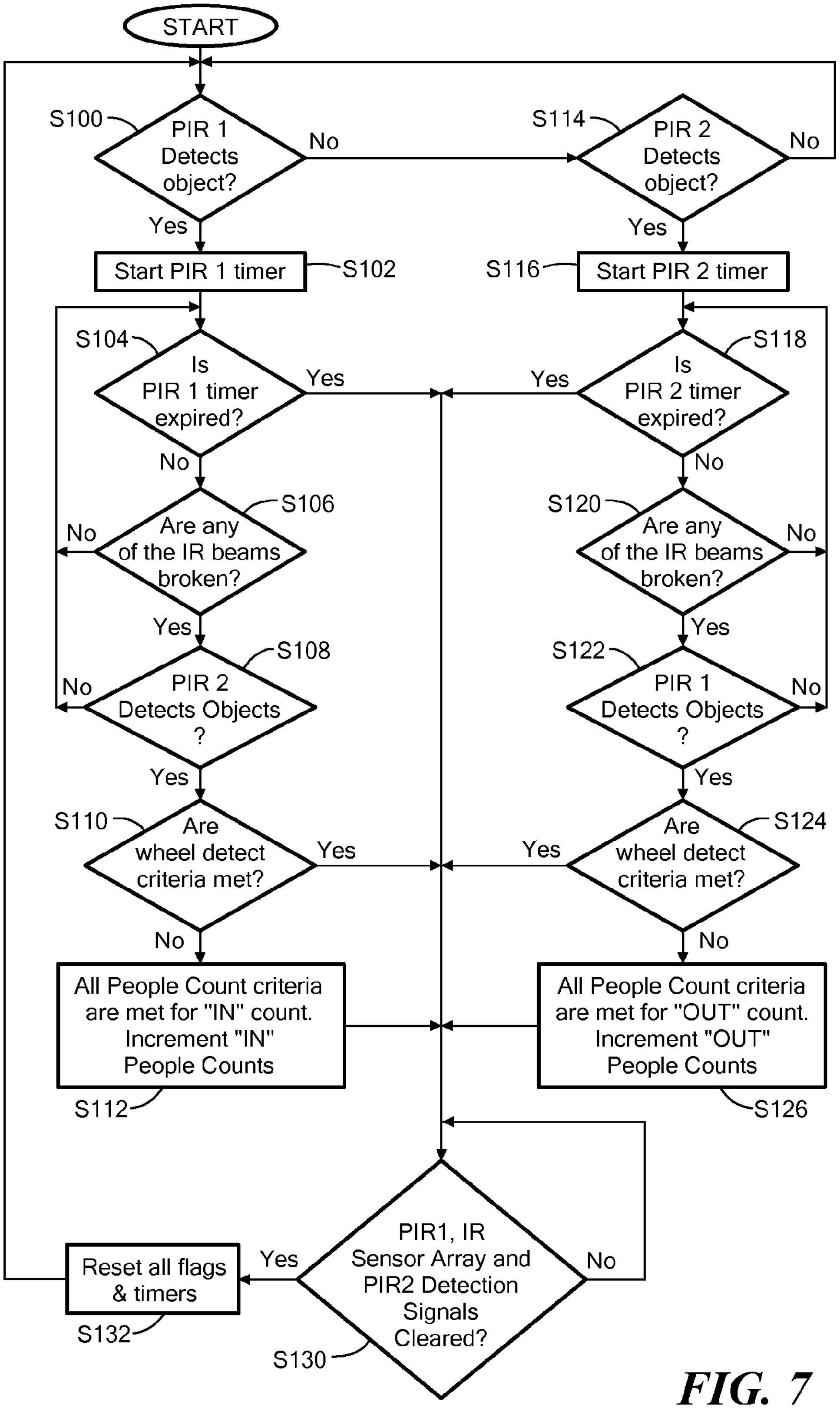
FIG. 7 is flow chart of an exemplary people counting process according to the principles of the present invention.

Referring to FIG. 7, a flowchart is provided that describes the steps performed by EAS detection system 10 for determining whether to increment the IN counter or OUT counter. For example, pedestals 12 are configured such that PIR detector 22*a* (referred to as "PIR 1") is proximate the entrance of a building and PIR detector 22*b* (referred to as "PIR 2") is distal the entrance, while the infrared sensor array 20 is positioned in between PIR 1 and PIR 2, as illustrated in FIG. 4. Also, PIR 1, PIR 2 and infrared sensor array 20 each generate respective detection signals. The people counter criteria is used to determine whether to increment the IN counter or OUT counter, or reset the process. In particular, the people counting criteria may use two or more detection signals to determine whether to increment one of the counters.

The process of FIG. 7 incorporates three detection devices, PIR 1, PIR 2 and infrared sensor array 20, to determine whether to increment the counters. Alternatively, any two of the detection devices may be used to determine whether to increment the counters, e.g., PIR 1 and PIR 2. After the process starts, e.g., the system is activated, the system determines whether PIR 1 detects an object. (step S100). For example, PIR 1 may transmit a detection signal to controller 16 indicating an object is within the PIR detection zone of PIR 1. In response to PIR 1 detecting an object, a PIR 1 timer may be initiated, e.g., countdown timer or count up timer (step S102). If PIR 1 timer has not expired, a determination is made whether any of infrared beams 26 are broken. (steps S104 and S106). If no beams are broken, the process returns to step S104 to determine whether PIR 1 timer has expired (step S106). In other words, an object may be detected by PIR 1 but the object fails to continue through the interrogation zone, e.g., person 24 decides not to enter the store and turns around. Therefore, no broken infrared beams 26 are detected (steps S104 and S106).

However, if infrared beams 26 are broken, a determination is made as to whether PIR 2 detects an object (step S108). For example, the object moving through the interrogation zone may move into PIR 2 detection zone. If PIR 2 detects an object, a determination is made as to whether the object is a wheeled-object, i.e., a determination is made based on the process of FIG. 8 (steps S108 and S110). If the object is determined to be a wheeled-object, all flags and timers are reset after PIR 1, PIR 2 and infrared beam detection signals are cleared (step S130 and S132). However, if the object is determined not to be a wheeled object and/or determined to be person 24, the IN counter is incremented (step S112). After the infrared beams 26, PIR 1 and PIR 2 detection signals have cleared, all flags and timers are reset (steps S130 and S132). Alternatively, all flags and timers may be reset after infrared beams 26 have cleared even if PIR 1 and/or PIR 2 detection signals have not cleared. For example, if PIR 1 is not cleared due to the object remaining substantially stationary within PIR 1 detection zone, PIR 1 may acclimate itself to the object such that movement of another object within the detection zone may be detected. In particular, the detected infrared emissions from the stationary object may be treated as part of the environment where system 10 is deployed, thereby requiring additional detected infrared emissions from another object to cause a change in detected infrared emissions. If the infrared beams are not cleared or do not clear within a predetermined time, the system administrator may be notified of the problem (not shown).

Referring back to step S100, when no object is detected by PIR 1, a determination is made whether an object is detected by PIR 2 (step S114). In particular, a determination is made that no object is entering the building due to the lack of a PIR 1 detection signal. In other words, the object may be exiting the building. If PIR 2 does not detect the object, a determination is made whether PIR 1 detects the object, i.e., alternate between checking PIR 1 and PIR 2. However, if PIR 2 detects an object (step S114), a PIR 2 timer is started (step S116). The PIR 2 timer may be a countdown timer that counts down from predetermined time or up to a predetermined time. Next, the PIR 2 timer is checked to determine whether it has expired (step S118). If the PIR 2 timer is determined to have expired, PIR 1 and PIR 2 flags and timers are reset. If PIR 2 timer is determined not to have expired, a determination is made as to whether infrared beams 26 are broken (step S120). In other words, whether the object that was detected by PIR 2 continues to move through the interrogation zone. If no infrared beams 26 are broken, a determination is made whether the second timer has expired (step S118).

However, if infrared beams 26 are determined to be broken, a determination is made as to whether PIR 1 detects the object (step S122). If PIR 1 does not detect the object, a determination is made whether the second timer has expired (step S122, S118). However, if PIR 1 detects the object, a determination is made as to whether the object is a wheeled-object or person 24 by performing the wheel detection process of FIG. 8 (step S124). If the object is determined to be a wheeled-object, the flags and the timers are reset after at least the infrared beam array 20 detection signals are cleared by the object leaving the interrogation zone, i.e., the detected object was not person 24 (steps S130 and S132). If the object is determined to not be a wheeled object and/or determined to be person 24, the OUT counter is incremented (step S126) and the flags and timers are reset (steps S130 and S132). The flags may be indicators stored in memory 36 that indicate a detection signal has been triggered. If the detection signals are not cleared within a predetermined time, the system administrator-may be notified.

While the present embodiment describes the use of PIR 1, PIR 2 and infrared sensor array 20 detection signals to determine whether to increment one of the people counters, the use of the third detection signals are optional, e.g., steps S108 and step S122 are optional. For example, referring to step S106, once infrared beams 26 are determined to be broken, a determination is made whether the object is a wheeled-object or person 24, step S110. In other words, detection signals from PIR 1 and the broken infrared beams 26 provide sufficient information to determine the direction of movement of the object, i.e., the object is entering the building, and whether the object is not a wheeled object and/or person 24. Using the third detection signal at steps S108 and/or S122 may provide for greater accuracy, e.g., can detect whether the object turns back midway through the interrogation zone, but is not required. The third detection signal in conjunction with the infrared beams may also be used to count people or objects traveling in opposite directions at the same time. Also, at step S120, a determination whether the object is person 24 or a wheeled-object (step S124) may be made after infrared beams 26 are determined to be broken (step S120), i.e., skip step S122. Also steps S106 and S110 (and conversely S120 and S124) may be skipped, relying only on PIR 1 and PIR 2 detection signals for people counting. Accordingly, the people counting method uses at least two detection signals to determine whether to increment one of the people counters.

Figure 8:
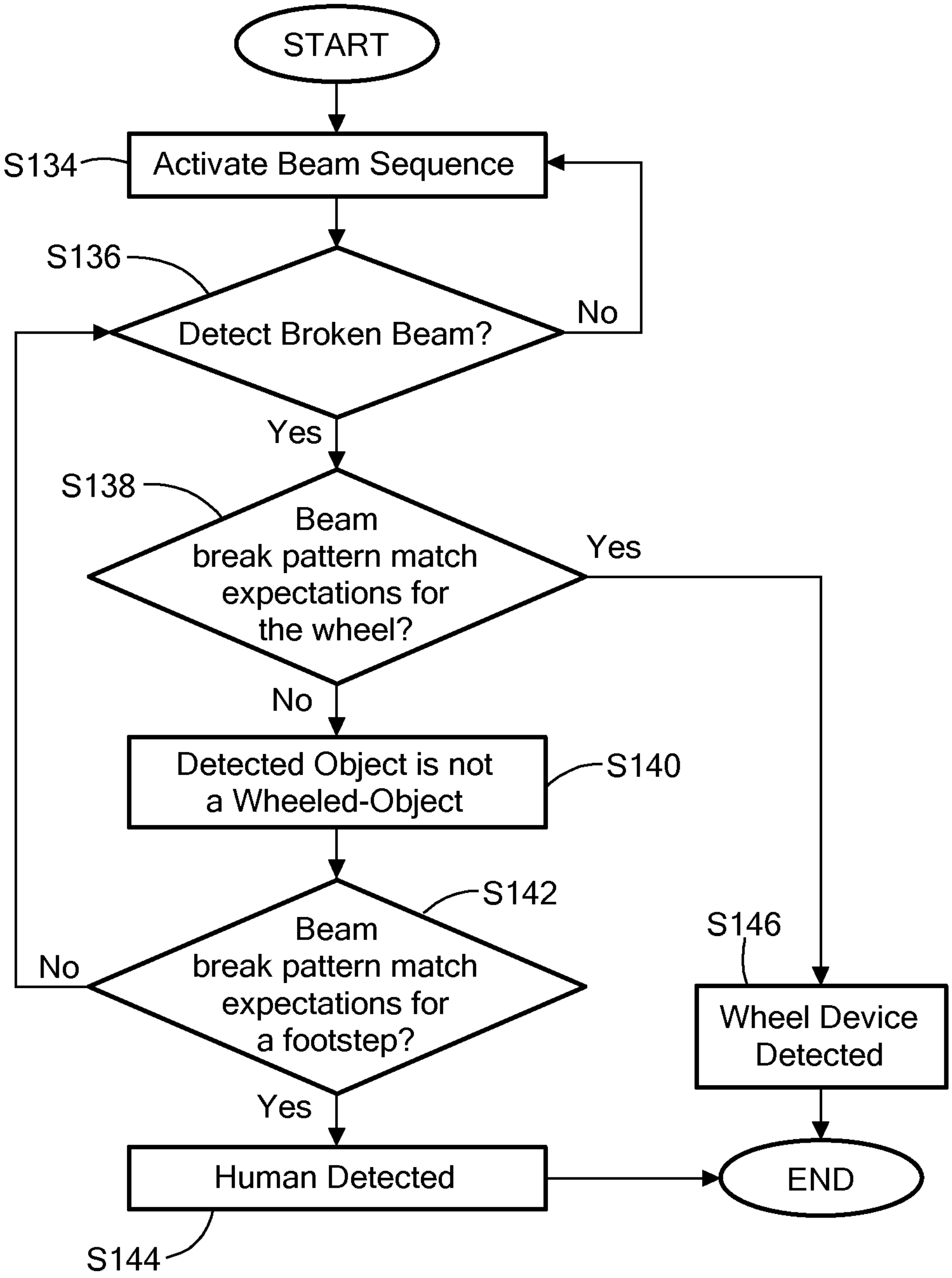
FIG. 8 is a flow chart of an exemplary wheeled-object determining process according to the principles of the present invention.

Referring to FIG. 8, a flowchart is provided that describes an exemplary wheel detection process performed by EAS detection system 10 to determine whether the object passing through the interrogation zone is a wheeled-object or person 24. The system controller 16 enables infrared sensor array 20 by activating a beam sequence which is dependent upon the configuration of the infrared sensor array 20 (step S134). The beam sequence runs in a continuous cycle as long as no beams are broken (step S136). For example, the beam sequence may be a sequential beam sequence turning on and off the beams according to lateral order or turning all beams on and off at the substantially the same time. When system controller 16 detects that a beam has been broken (step S136), the cart detection module monitors infrared sensor array 20 to determine whether the present beam breakage pattern matches the expected pattern for a wheel (step S138).

For example, an expected pattern for a wheel may be that each beam is broken sequentially for a given number of beams, up to and including all beams, and only a given number of beams are broken at any time. If the pattern does not match the expected pattern for a wheeled-object (step S138), it is determined that the object is not a wheeled-object (step S140). The determination that the object is not a wheeled-object is sufficient to determine the IN counter or OUT counter should be incremented, i.e., steps S142 and S144 may be optional steps.

Moreover, for additional people detection accuracy, the process of FIG. 8 may also include comparing the breakage pattern to the expected pattern for person 24 walking (step S142). An expected pattern for person 24 walking may be that up to a predetermined number of beams are simultaneously broken and/or not all the beams of the array are broken. If the pattern matches person 24 walking, then system controller 16 determines that person 24 is detected (step S144). If the pattern does not match the expected pattern for person 24 walking (step S142), a determination is made as to whether any other beams have been broken (step S136), thereby changing the current breakage pattern. Returning to step S138, if the current breakage pattern matches the expected pattern for a wheeled-object, a determination is made that a wheeled-object was detected (step S146). Alternatively, if the breakage pattern does not match any pattern stored in controller 16, a default determination may be made as to the object. For example, the default determination may be that the object is a wheeled-object, person 24, among other default determinations.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system for counting, the system comprising:

a first zone detector configured to detect motion in a first zone, the first zone detector including a first passive infrared ("PIR") detector configured to detect motion of an object based on an amount of infrared emissions of the object;

a second zone detector configured to detect motion in a second zone different from the first zone, the second zone detector including a second PIR detector configured to detect motion of an object based on an amount of infrared emissions of the object;

a sensor array, the sensor array configured to:

generate a plurality of breakable beams; and detect a pattern of broken beams, the pattern of broken beams being based on movement of the object; and a processor in communication with the first zone detector, second zone detector and sensor array, the processor configured to:

receive data from the first zone detector, second zone detector and sensor array; and one of increment and decrement a first count value based at least in part when:

the first zone detector detects motion;

the sensor array detects the pattern of broken beams after the first zone detector detects motion; and the second zone detector detects motion after both the first zone detector detects motion and the sensor array detects the pattern of broken beams.

2. The system of claim 1, wherein the first count value is incremented when the first PIR detector detects motion before the second PIR detector detects motion.

3. The system of claim 2, wherein the processor is further configured to increment a second count value when the second PR detector detects motion before the first PIR detector detects motion.

4. The system of claim 1, wherein the processor is further configured to start a timer when the first PIR detector detects motion, the timer ending after a predefined time.

5. The system of claim 4, wherein the first count value is one of incremented and decremented when the second PIR detector detects motion before the timer ends.

6. The system of claim 5, further comprising:

a pair of EAS pedestals;

the sensor array being a plurality of infrared sensor pairs, each infrared sensor pair including one infrared transmitting component and one infrared receiving component, the transmitting component located on one EAS pedestal of the pair of EAS pedestals, the receiving component located on the other EAS pedestal of the pair of EAS pedestals, each infrared sensor pair configured to form one of the plurality of breakable beams between the pedestals when activated; and the timer expiring when no beams are broken within the predefined time.

7. The system of claim 6, further comprising a wheel detector module configured to determine the object passing between the pair of EAS pedestals is a wheeled-object by matching the pattern of broken beams to an expected broken beam pattern for the wheeled device; and the first count value is not incremented when the wheel detector module determines that a wheeled-object is passing between the pair of EAS pedestals.

8. The system of claim 1, wherein the processor is further configured to start a timer when the second PIR detector detects motion before the first PIR detector detects motion, the timer ending after a predefined time.

9. The system of claim 8, wherein a second count value is incremented when the first PIR detector detects motion before the timer ends.

10. The system of claim 9, further comprising:

a pair of EAS pedestals;

the sensor array being a plurality of infrared sensor pairs, each infrared sensor pair including one transmitting component and one receiving component, the transmitting component located on one EAS pedestal of the pair of EAS pedestals, the receiving component located on the other EAS pedestal of the pair of EAS pedestals, each infrared sensor pair configured to form one of the plurality of breakable beams between the pedestals when activated; and the timer expiring when no beams are broken within the predefined time.

11. The system of claim 10, further comprising a wheel detector module configured to determine the object passing between the pair of EAS pedestals is a wheeled-object by matching the pattern of broken beams to an expected broken beam pattern for the wheeled device; and the first and second count values not being incremented when the wheel detector module determines that a wheeled-object is passing between the EAS pedestals.

12. An electronic article surveillance ("EAS") system, the system comprising:

a people counting device, having:

a first object detector configured to detect objects located within a first zone based on an amount of infrared emissions of the object, the first object detector transmitting a detection signal in response to detecting an object;

a second object detector configured to detect the objects located within a second zone different from the first zone based on an amount of infrared emissions of the object, the second object detector transmitting a detection signal in response to detecting an object;

a timer configured to start a timing sequence upon receiving the detection signal;

a sensor array, the sensor array configured to:

generate a plurality of breakable beams; and detect a pattern of broken beams, the pattern of broken beams being based on movement of the object; and a cart detection module configured to determine whether the object is a wheel-object object based on the pattern of broken beams; and a controller in communication with the first object detector, cart detection module and timer, the controller configured to:

receive data from the first object detector and the timer to initiate gathering information from the cart detection module; and one of increment and decrement a people count value based at least in part when:

the first object detector detects motion;

the sensor array detects the pattern of broken beams; and the second object detector detects motion after both the first object detector detects motion and the sensor array detects the pattern of broken beams.

13. The EAS system of claim 12, wherein the cart detection module is further configured to determine whether the object is a person based on the pattern of broken beams; and the people counter value is incremented when the cart detection module determines a person passed through the region monitored by the sensor array before the timing sequence expires.

14. The EAS system of claim 12, wherein the controller is in communication with the second object detector, the controller configured to determine not to increment the people counter value when no object is detected in the second zone and the timing sequence expires.

15. The EAS system of claim 12, wherein the people counter value is not incremented if the determination is made that the object is the wheeled-object.

16. The EAS system of claim 15, wherein the counter value is incremented if the determination is made that the object is the person.

17. A method for counting objects using an electronic article surveillance ("EAS") system, the method comprising:

detecting an object moving within a first zone;

detecting the object moving within a second zone different from the first zone;

initiating a timer sequence in response to the detection of the object in at least one of the first and second zones;

generating a plurality of breakable beams with a sensor array;

detecting a pattern of broken beams, the pattern of broken beams being based on movement of the object;

determining whether the object is a wheeled-object based on the pattern of broken beams of the object; and incrementing a first people count value based at least in part when:

the object is detected in the first zone;

the pattern of broken beams is detected by the sensor array after the detection of the object within the first zone;

the object is detected within the second zone after both the object is detected within the first zone and the pattern of broken beams are detected by the sensor array; and the object is determined to not be a wheeled-object based on the pattern of broken beams.

18. The method of claim 17, wherein determining whether the object is a person based on the pattern of broken beams of the sensor array.

19. The method of claim 18, wherein the first people count value is not incremented when the object is determined to be a wheeled-object.

20. The method of claim 17, wherein the first count value is incremented when the object is determined to be a person.

* * * * *